Nov. 8, 1932.  F. N. G. KRANICK  1,887,355
TRACTOR
Filed Oct. 9, 1931   2 Sheets-Sheet 1
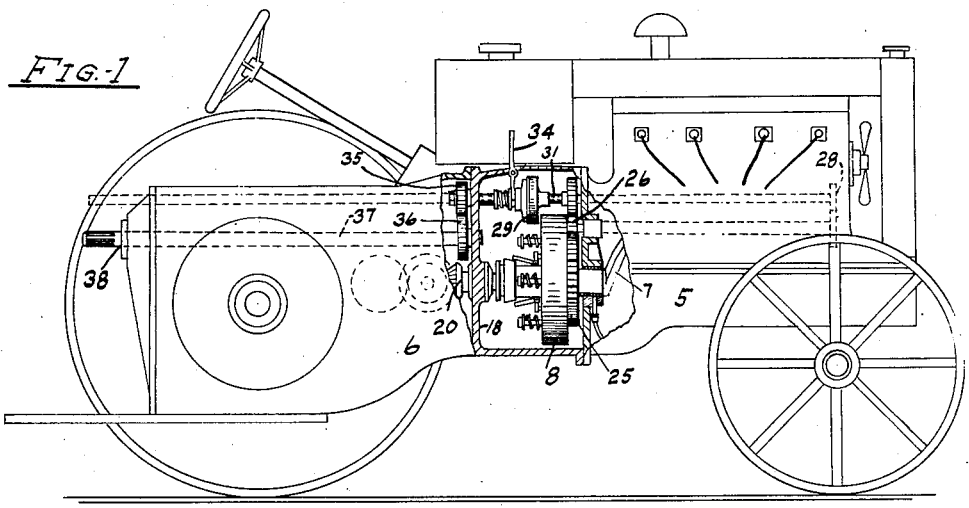
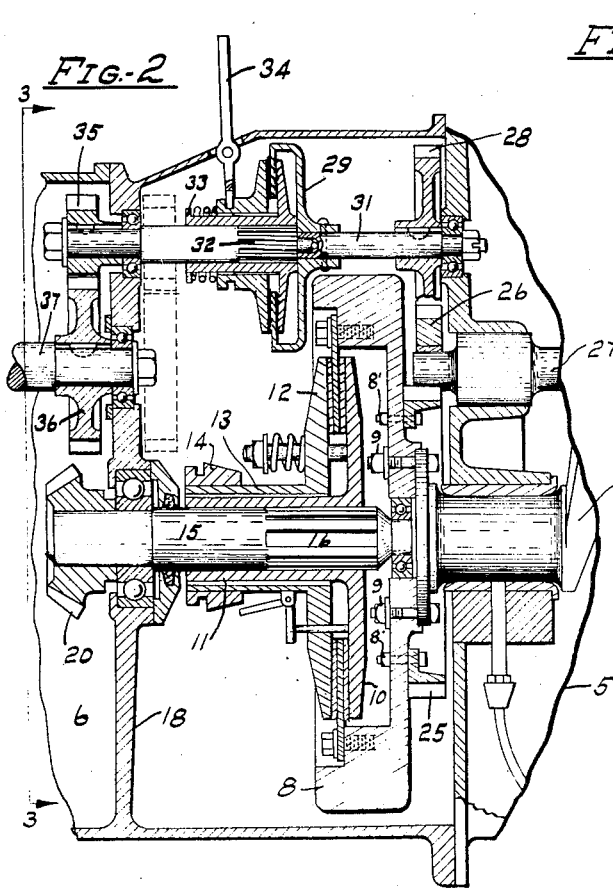
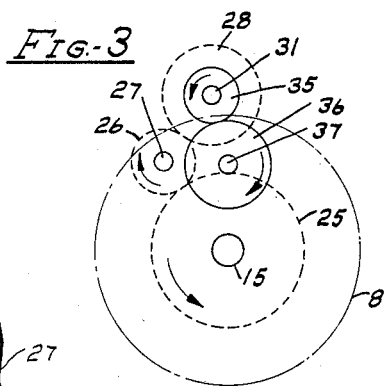
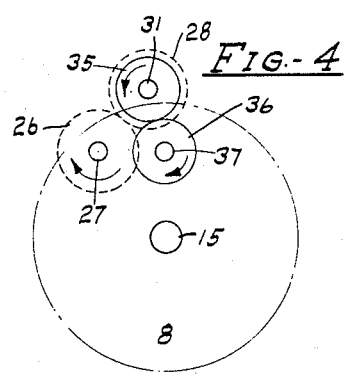
INVENTOR.
FRANK N. G. KRANICK
BY James A. Walser
ATTORNEY

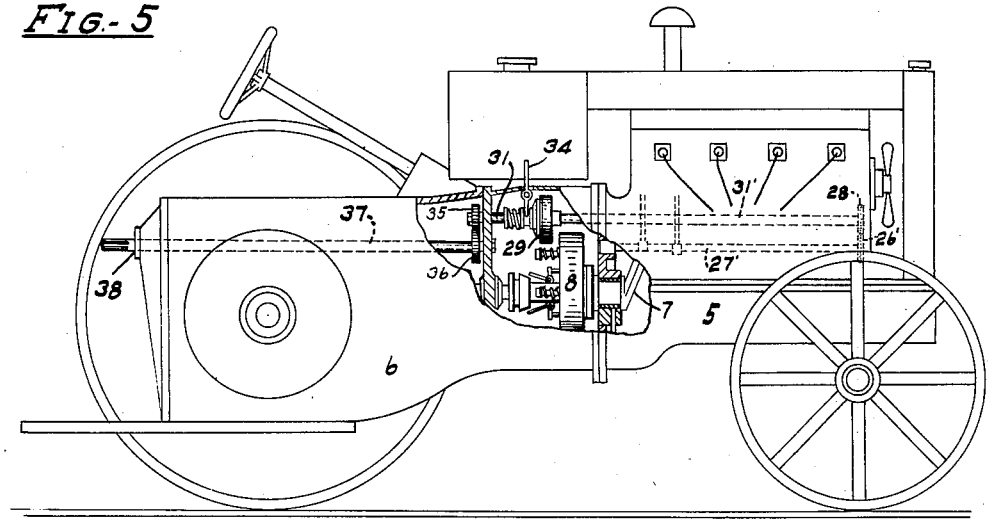
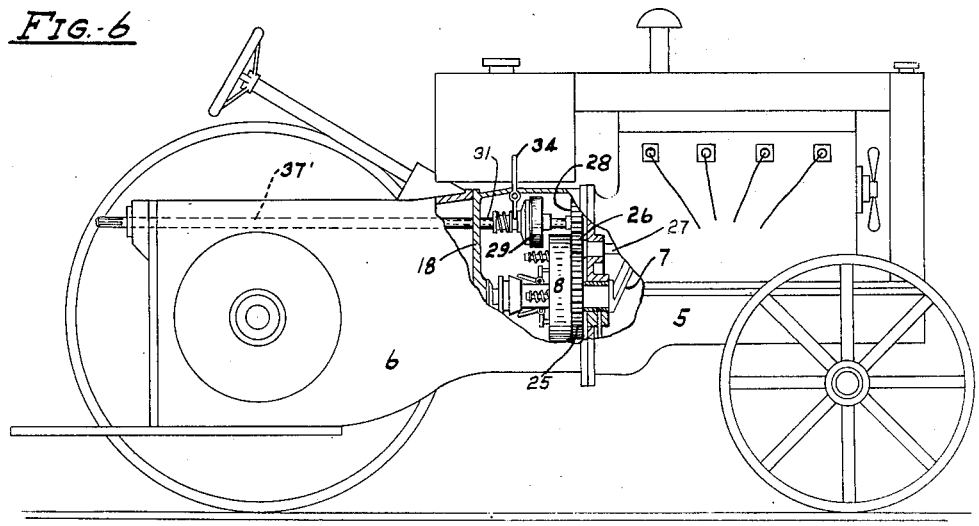

Patented Nov. 8, 1932

1,887,355

UNITED STATES PATENT OFFICE

FRANK N. G. KRANICK, OF RACINE, WISCONSIN, ASSIGNOR TO J. I. CASE COMPANY, OF RACINE, WISCONSIN, A CORPORATION

TRACTOR

Application filed October 9, 1931. Serial No. 567,857.

In providing tractors with power take-off shafts it is the practice to so gear the power shaft to the clutch-shaft that when the latter shaft is declutched from the fly-wheel the transmission, power shaft and other rotary elements depending upon actuation from the clutch-shaft must cease rotation, and, therefore, in operating other machines connected with the power take-off, requiring unvarying or constant speed, it becomes necessary to shift certain gears of the transmission system into neutral relation and thus disengaged from the clutch-shaft, and also to engage the power shaft with the clutch-shaft by sliding gear, clutch or other means, so that the power shaft will rotate independently of the disengaged or idle transmission, but in making such shifts and adjustments more or less appreciable cessation of rotation of the power shaft occurs, according to the skill of the operator, and which interruptions defeat the efficient and necessary continuous operation of certain machines or implements requiring constant speed. It is my object, therefore, to provide a power shaft for tractors and the like which will be driven independently of the clutch-shaft as the tractor is either being propelled or in stationary position, and which I accomplish by a system of gearing, including a clutch, interposed between the power shaft and the cam-shaft or fly-wheel, so that the power shaft will be thus initially driven directly from the engine instead of by the clutch-shaft extending from the rear of the clutch as is common, and by which means the power shaft will be uninterruptedly rotated irrespective of the clutch-shaft, as will further appear.

In the accompanying drawings, forming part hereof, Figure 1 is a side elevation of a tractor equipped with my improvement; Fig. 2, an enlarged detail section showing a power shaft and my improved means for rotating it from the fly-wheel; Fig. 3, a diagrammatic view, taken on the dotted line 3—3 in Fig. 2, showing the relation of assembled rotary elements forming part of my improvement, as embodied in the preferred arrangement; Fig. 4 is also a diagrammatic view of an equivalent alternative form of gear assemblage accomplishing my purpose, and Figs. 5 and 6 are side elevations of a tractor showing modified forms of my improvement.

In said drawings the numeral 5 indicates the crank-case and 6 the transmission housing of a tractor of any desired construction and arrangement embodying my improvement.

The crank-shaft 7 is connected to a flywheel 8 by bolts 9, and in which wheel is mounted a clutch comprising the member 10 having a sleeve 11 extending rearwardly therefrom, and the member 12 having a hub 13 mounted on said sleeve, the member 13 being shiftable toward and from member 10 by a lever (not shown) adapted to engage the shifter 14, and which clutch and details of construction associated therewith may be constructed, assembled and adjusted in any well known or desired manner. The clutch-shaft 15, splined at 16, is mounted in sleeve 11, and is engaged by the fly-wheel for rotating said parts, which, with the fly-wheel and other parts, are enclosed within a clutch casing 18, the clutch-shaft 15 extending rearwardly into the transmission casing 6 and provided with a bevel gear 20 adapted to engage the transmission gearing indicated by dotted lines in Fig. 1, as is common, for starting and stopping the tractor.

In carrying out my invention in its preferred form I employ a gear 25 connected to the face of the fly-wheel 8 by bolts 8', which gear meshes with an idler pinion 26 mounted on the cam-shaft 27, or otherwise, which idler in turn engages a gear 28 for rotating a clutch 29 mounted on a counter-shaft 31, the latter being supported in the clutch casing 18, and which counter-shaft embodies a splined portion 32 engaging the sleeve 33 of said clutch, which may be substantially similar to the clutch 10—12 associated with fly-wheel 8, or of any other desired construction, and provided with a shifting lever 34 for engaging and disengaging the clutch parts in a manner well known. Said counter-shaft 31 preferably extends into the transmission 6, and has mounted at its end a gear 35 which engages a gear 36 on a power take-off shaft 37 mounted in the clutch casing, its opposite end being mounted in the rear of the tractor, at 38, as indicated in Fig. 1, said power shaft being arranged and rotatable entirely independently from the clutch and transmission. It will be understood, of course, that the power shaft may extend into the clutch casing and its end geared to a gear on shaft 31 in alignment therewith in said casing, as indicated by dotted lines in Fig. 2, either of which gear locations will be within the scope of my invention, or which power shaft may be connected to shaft 31 and extend through the tractor body as indicated by the dotted lines 37', Fig. 6, but my preferred arrangement, for convenience of assemblage and access, is indicated by full lines in Fig. 2.

In Fig. 3 is illustrated diagrammatically the positions of the various gears in relation to the fly-wheel 8, and which, as indicated, is the preferred arrangement and assemblage of such elements, but the same result of driving the power shaft 37 by means in advance of the main clutch 10—12 may be accomplished by the slightly modified form shown in Fig. 4 and by the dotted lines 27' and 31' in Fig. 5, the latter being an extension of shaft 31 having the gear 28 transferred to its forward end and engaging gear 26' on the cam-shaft 27, by which the latter shaft through its geared arrangement with actuating mechanisms (not shown) in the engine system, as is common, imparts rotary motion to shaft 31' so that it will rotate the power shaft 37 through the gears 35 and 36 in the manner before stated, it being understood that in this arrangement gear 25 is unnecessary on the fly-wheel 8. And it will also be understood by reference to Fig. 6 that as a further alternative assemblage to obtain the same results in rotating the power shaft directly from the engine and uninfluenced by the clutch shaft 15 by means located forwardly of the main clutch 10—12 the gear 25 may be engaged with an idler 26 mounted on the cam-shaft 27 or in other suitable manner and engaging gear 28, by which rotary motion will be imparted to shaft 31 and thence to power shaft 37' in the manner already stated.

It will thus be seen that the power take-off shaft 37 is positioned and actuated entirely independently of the transmission mechanism or the clutch-shaft 15, through a continuous interengaging train of gearing and an interposed clutch operatively connecting the power shaft with actuating means associated with the engine only and located forwardly of and independently of the main clutch, whereby said power shaft may be uninterruptedly rotated irrespective of the clutch-shaft and transmission when the tractor is either moving or stationary, as there are no gears, levers or other mechanisms directly affecting the power shaft requiring the attention of the operator, as is common, other than the clutch shift 34 for stopping and starting the power shaft.

I claim as my invention:

1. In a tractor having a crank-casing and a transmission-casing, clutch mechanism between said casings, a cam-shaft extending forwardly in relation to the clutch and having a gear, a counter-shaft adjacent the cam-shaft and having a gear thereon engaged and driven by said cam-shaft gear, a power-shaft driving-gear on the counter-shaft, a power-shaft extending rearwardly in longitudinal relation to the transmission casing and having a gear engaging and driven by said counter-shaft gear, and means for actuating the cam-shaft to rotate said power-shaft through said interengaging gears.

2. In a tractor having a crank-casing and a transmission-casing, clutch mechanism between said casings, a cam-shaft extending forwardly in relation to the clutch and having a gear, a counter-shaft adjacent the cam-shaft and having a gear thereon engaged and driven by said cam-shaft gear, a power-shaft driving-gear on the counter-shaft, a power-shaft extending rearwardly in longitudinal relation to the transmission casing and having a gear engaging and driven by said counter-shaft gear, means for actuating the cam-shaft to rotate said power-shaft through said interengaging gears, a clutch on the counter-shaft, and means for adjusting the clutch whereby the power-shaft may be rotated and the rotation thereof discontinued.

3. In a tractor having a fly-wheel, a clutch-shaft extending rearwardly from and rotated by the fly-wheel for actuating a transmission system, a power-shaft adjacent the clutch-shaft, an engine driving means positioned forwardly of the fly-wheel and associated directly with the engine, and means engaging the driving means and the power-shaft whereby the latter is driven independently of the clutch-shaft.

4. In a tractor including a power plant, a fly-wheel, clutch mechanism engaging and driven by the fly-wheel, a casing including a transmission system, a clutch-shaft engaging the transmission for actuating the latter, a power shaft in the transmission casing adapted to be attached to and actuate implements, and an interengaging gear and shaft system spanning the fly-wheel and engaging the power shaft and actuating mechanism of the power plant for rotating the power shaft independently of the clutch-shaft and transmission.

5. In a tractor including a power plant, a fly-wheel, clutch mechanism engaging and driven by the fly-wheel, a casing including a transmission system, a clutch-shaft engaging the transmission for actuating the latter, a power-shaft in the transmission casing adapted to be attached to and actuate implements, an interengaging gear and shaft system spanning the fly-wheel and engaging the power shaft and actuating mechanism of the power plant for rotating the power-shaft independently of the clutch-shaft and transmission, and means interposed in said gear system for disengaging the same to discontinue rotation of the power shaft.

6. In a tractor including a power plant, a fly-wheel connected to and driven by the power plant, a driving gear on the fly-wheel, an intermediate gear engaging the fly-wheel gear, a counter-shaft spanning the fly-wheel and having a gear engaging the intermediate gear, a power-shaft, and means engaging the counter-shaft and power-shaft for rotating the latter.

7. In a tractor including a power plant, a fly-wheel connected to and driven by the power plant, a driving gear on the fly-wheel, an intermediate gear engaging the fly-wheel gear, a counter-shaft having a gear engaging the intermediate gear, a power-shaft mounted and extending rearwardly of the fly-wheel through the tractor for actuating a drawn implement, means engaging the counter-shaft and power-shaft for rotating the latter, and means associated with the counter-shaft for discontinuing rotation of the power-shaft.

8. In a tractor having an engine including a driving shaft, a fly-wheel on said shaft, a gear on the fly-wheel, clutch mechanism connected to the fly-wheel, a clutch-shaft extending from the clutch mechanism, a transmission engaged and driven by the clutch-shaft, an intermediate gear engaging the fly-wheel gear, a counter-shaft having a gear at one end engaging and driven by the intermediate gear, a gear on the opposite end of the counter-shaft, and a power shaft engaged and driven by said last mentioned gear whereby the power shaft is actuated directly from the driving shaft and independently of the clutch and transmission mechanisms.

9. In a tractor including an engine having a driving shaft, a support for the rear end of the shaft, a fly-wheel on the shaft, a driving gear on the face of the fly-wheel, clutch mechanism mounted on the opposite side of the fly-wheel, a clutch-shaft in said mechanism, a support for the rear end of the clutch-shaft, transmission mechanism engaged and driven by the clutch-shaft for starting and stopping the tractor, a power shaft associated with the tractor and mounted on the clutch-shaft support, and means engaging the power shaft and the driving gear on the fly-wheel whereby power from the engine driving shaft will be conveyed directly to the power shaft to rotate the latter independently of the clutch and transmission mechanisms for actuating an implement connected to the power shaft.

10. In a tractor, an engine, clutch mechanism associated with the engine and having a shaft, a transmission engaged and driven by the clutch-shaft for starting and stopping the tractor, a power shaft in the tractor disassociated from the clutch-shaft and transmission, and driving means located on the engine and connected to the power shaft whereby the latter is driven directly by the engine irrespective of the clutch-shaft and transmission for actuating drawn implements adapted to travel with the tractor.

In testimony whereof I affix my signature.
FRANK N. G. KRANICK.